United States Patent
Moesle (10) Patent No.: US 8,437,572 B2
(45) Date of Patent: May 7, 2013

(54) METHOD FOR SHARPNESS ENHANCING AN IMAGE

(75) Inventor: Frank Moesle, Stuttgart (DE)

(73) Assignee: Sony Deutschland GmbH, Berlin (DE)

( * ) Notice: Subject to any disclaimer, the term of this patent is extended or adjusted under 35 U.S.C. 154(b) by 1277 days.

(21) Appl. No.: 11/688,451

(22) Filed: Mar. 20, 2007

(65) Prior Publication Data

US 2007/0286522 A1 Dec. 13, 2007

(30) Foreign Application Priority Data

Mar. 27, 2006 (EP) .................................. 06 006 321

(51) Int. Cl.
*G06K 9/40* (2006.01)
*H04N 9/74* (2006.01)
*H04N 5/00* (2006.01)

(52) U.S. Cl.
USPC ........... 382/263; 382/254; 382/275; 348/606; 348/597

(58) Field of Classification Search ........................ None
See application file for complete search history.

(56) References Cited

U.S. PATENT DOCUMENTS

| | | | |
|---|---|---|---|
| 6,055,340 A | 4/2000 | Nagao | |
| 2003/0190090 A1* | 10/2003 | Beeman et al. | 382/284 |
| 2004/0071360 A1* | 4/2004 | Maurer | 382/254 |
| 2005/0041883 A1 | 2/2005 | Maurer et al. | |
| 2005/0123172 A1* | 6/2005 | Henson | 382/103 |
| 2008/0267443 A1* | 10/2008 | Aarabi | 382/100 |

FOREIGN PATENT DOCUMENTS

WO WO 2006/018789 A1 2/2006

OTHER PUBLICATIONS

Luigi Atzori, et al., "Adaptive Anisotropic Filtering (AAF) for Real-Time Visual Enhancement of MPEG-Coded Video Sequences", IEEE Transactions on Circuits and Systems for Video Technology, vol. 12, No. 5, XP-001116984, ISSN: 1051-8215, May 2002, pp. 285-298.

J. S. Lim, Two-dimensional Signal and Image Processing, XP-002381518, 1990, pp. 483 and 533-536.

P. Bakker, et al., "Edge Preserving Orientation Adaptive Filtering", IEEE Computer Society Conference on Computer Vision and Pattern Recognition, vol. 1, XP-010347626, Jun. 23, 1999, pp. 535-540.

A. Vanzo, et al., "An Image Enhancement Technique Using Polynomial Filters", Proceedings of the International Conference on Image Processing (ICIP), IEEE Comp. Soc. Press, vol. 3, Conf. 1, XP-010146216, ISBN: 0/8186-6952-7, Nov. 13-16, 1994, pp. 477-481.

A. Polesel, et al., "Adaptive Unsharp Masking for Contrast Enhancement", Image Processing, Proceedings, International Conference, IEEE Comput. Soc., vol. 1, XP-010254160, ISBN 0/8186-8183-7, Oct. 26-29, 1997, pp. 267-270.

* cited by examiner

*Primary Examiner* — Randolph I Chu
(74) *Attorney, Agent, or Firm* — Oblon, Spivak, McClelland, Maier & Neustadt, L.L.P.

(57) ABSTRACT

A method for sharpness enhancing digital image data (ID), including: generating an intermediate processed image (IPI), in which uniform sections of the digital image data (ID) are cleaned from noise and in which at least one of a group consisting of contours, edges, wedges, structures and textures are detected, wherein the uniform section each fulfil a predefined uniformity criterion, which is descriptive for at least one of a group consisting of uniformity, flatness, structure, and noise content; deriving a blend value b for each pixel (Pbjkab) from the intermediate processed image (IPI) with b ranging between 0 corresponding to flatness and 1 corresponding to texture; two-dimensional sharpness enhancing the digital image data (ID) to generate processed digital image data (PID); and generating output data (outD) by pixelwise blending the digital image data with the processed digital image data.

15 Claims, 7 Drawing Sheets

Pbjkab -> Pbjkab := min(Var(N1),Var(N2),Var(N3),Var(N4))

Noise Cleaning

Fig. 1 - Image Sequence

Fig. 2 - Subdivision into Blocks

Fig. 3 - Subdivision into Pixels

Fig. 4 - General Processing Scheme

Fig. 5 - Sharpness Enhancement I

Fig. 6 - Sharpness Enhancement II

Pbjkab -> Pbjkab := min(Var(N1),Var(N2),Var(N3),Var(N4))

Fig. 7 - Noise Cleaning

METHOD FOR SHARPNESS ENHANCING AN IMAGE

FIELD OF THE INVENTION

The present invention relates to a method for sharpness enhancing digital images and digital image data. More particular, the present invention relates to a method for controlling image sharpness enhancement, in particular on noisy images.

BACKGROUND OF THE INVENTION

In many applications and customer devices, before displaying images the underlying images and image data have to be pre-processed in order to better adapt the image properties. One aspect is the enhancement of sharpness of the image. The problem when enhancing the sharpness of an image is that the process in general is applied to all image details represented by the image data. However, some of the image details indeed stem from noise components which are also contained in the image. Under the process of sharpness enhancement also the noise components contained in the image data are enhanced and therefore amplified.

SUMMARY OF THE INVENTION

It is therefore an object of the present invention to provide a method for sharpness enhancing of digital image data which is capable of enhancing the sharpness of useful image structures and to not enhance noise components contained in the images.

The present invention relates to a method for sharpness enhancing digital image data. A basic idea is to choose the degree of enhancing the sharpness in a local manner to thereby enhance only local parts of the underlying image and to thereby avoid or reduce enhancing noise components contained in the underlying image.

According to a most general view of the present invention the inventive method for enhancing sharpness of image data is based on the aspect of locality of the sharpness enhancing process. Locality in the sense of the present invention means that local areas of the underlying image are treated in general differently from each other, namely in dependence of the local properties of the local areas. Therefore, the process of enhancing sharpness is according to the present invention locally designed in order to better take care and take into account the local aspects of the different areas contained in the underlying image. For instance, but not restricted thereto is the local adjustment of the degree of sharpness enhancement in order to treat areas with different noise and/or texture in a different way. Thereby the enhancement of noise can be avoided, whereas useful structures to be enhanced may be for instance enhanced in the usual way.

According to a first general solution for the object underlying the present invention the invention provides a method for sharpness enhancing digital image data wherein in a process of enhancing sharpness of image data ID representing an image I noise or noise components contained in the underlying image I to be sharpness enhanced and/or in the underlying digital image data ID or a part thereof are taken into account and/or are treated in a local manner with respect to the underlying image I and/or in the underlying digital image data ID or a part thereof, wherein thereby enhancing said noise or said noise components in said image I and/or in the underlying digital image data ID or the respective part thereof is one of reduced or avoided and sharpness enhancement is achieved with received or no side effects.

According to a second general solution for the object underlying the present invention the invention provides a method sharpness enhancing digital image data wherein a process of enhancing sharpness of image data ID representing an image I is locally applied to the underlying image I to be sharpness enhanced and or in the underlying digital image data ID or a part thereof, wherein the degree of enhancing sharpness is controlled by respective local properties in said underlying image I, the underlying digital image data ID or the respective part thereof, and wherein thereby enhancing said noise or said noise components in said image I and/or in the underlying digital image data ID or the respective part thereof is one of reduced or avoided and sharpness enhancement is achieved with received or no side effects.

BRIEF DESCRIPTION OF THE DRAWINGS

The invention will now be explained based on preferred embodiments thereof and by taking reference to the accompanying and schematical figures.

DETAILED DESCRIPTION OF THE INVENTION

In the following functional and structural similar or equivalent element structures will be denoted with the same reference symbols. Not in each case of their occurrence a detailed description will be repeated.

According to a first solution for the object underlying the present invention the invention provides a method for sharpness enhancing digital image data wherein in a process of enhancing sharpness of image data ID representing an image I noise or noise components contained in the underlying image I to be sharpness enhanced and/or in the underlying digital image data ID or a part thereof are taken into account and/or are treated in a local manner with respect to the underlying image I and/or in the underlying digital image data ID or a part thereof, wherein thereby enhancing said noise or said noise components in said image I and/or in the underlying digital image data ID or the respective part thereof is one of reduced or avoided and sharpness enhancement is achieved with received or no side effects.

According to a second solution for the object underlying the present invention the invention provides a method sharpness enhancing digital image data wherein a process of enhancing sharpness of image data ID representing an image I is locally applied to the underlying image I to be sharpness enhanced or in the underlying digital image data ID or a part thereof, wherein the degree of enhancing sharpness is controlled by respective local properties in said underlying image I, the underlying digital image data ID or the respective part thereof, and wherein thereby enhancing said noise or said noise components in said image I and/or in the underlying digital image data ID or the respective part thereof is one of reduced or avoided and sharpness enhancement is achieved with received or no side effects.

Of course both solutions can be combined.

The inventive method may comprise (a) a step of providing S1 said digital image ID as input data InD which are representative for said underlying image I to be sharpness enhanced, (b) a step of sharpness enhancing S2 said underlying image I by appropriately processing said digital image data ID or a derivative thereof to thereby generate processed digital image data PID being representative for the processed image PI, I', and (c) a step of providing said processed digital image data PID as output data outD which are representative for the processed and therefore sharpness enhanced image PI, I', (d) wherein the locality of said taking into account of said noise or noise components and/or said treatment of said noise or noise components is performed and realised at least in said step (b) of sharpness enhancing S2 said image I.

The locality of said taking into account said noise or noise components and/or said treatment of said noise or noise components is realised by (A) a step of defining and selecting T1 in said underlying image I, said respective digital image data ID or said derivative thereof a plurality of blocks Bjk and (B) a step of classifying T2 each of said blocks Bjk by deriving block classification data BCD which are locally descriptive for at least one of the group consisting of noise level, flatness level, and texture level of said underlying image I, said respective digital image data ID or said derivative thereof in the respective block Bjk, (C) wherein said step (b) of sharpness enhancing S2 said underlying image I is based on said blocks Bjk and controlled based on said block classification data BCD.

Within said step (B) of classifying T2 said blocks Bjk a local analysis of the structure of the underlying image I, of the respective digital image data ID or of the respective derivative thereof may be performed, in particular based on said blocks Bjk.

Sections may be detected in said underlying image I, in said respective digital image data ID or in said respective derivative thereof as uniform sections USjk, in particular based on said blocks Bjk, which fulfill a predefined uniformity criterion.

Said uniformity criterion may be descriptive for at least one of the group consisting of uniformity, flatness, structure, and noise content.

No or only a reduced degree of sharpness enhancement may be applied to said uniformity sections USjk.

Said uniformity criterion may be described based on an uniformity function U.

At least one of the group consisting of statistical properties, statistical standard deviation σ and statistical variance may be used for said uniformity criterion and in particular as a uniformity function U, each of which being applied.

A given block Bjk may be classified as a uniform section USjk if the corresponding uniformity function value Ujk of the respective block Bjk based on the uniformity function U is below a given threshold value Th.

A certain uniformity value Uglob may be used as said threshold value Th which is obtained by applying said uniformity function U to the entire underlying image I, the respective digital image data ID or the respective derivative thereof, in particular according to the following formula I:

$$Th := Uglob := U(I), \quad (I)$$

with I denoting the image, U denoting the uniformity function, Uglob denoting the value of the uniformity function for the entire image I, and Th denoting the threshold value.

Then said uniform sections USjk may be cleaned from noise with preserving at least one of the group consisting of contours, edges, wedges, structures, and/or texture in said underlying image I, said respective digital image data ID or said respective derivative thereof.

Said process of cleaning uniform sections USjk from noise or noise components may be based on a filter process.

A Kuwahara filter process may be used as said filter process.

Said filter process is applied to each picture element or pixel PBjkab of said image I of a respective uniform section USjk.

For each picture element or pixel PBjkab of a uniform section USjk to be processed respective four rectangular neighbourhood regions N1, . . . , N4 having said picture element or pixel PBjkab as a corner may be defined and evaluated with respect to respective statistical properties, in particular with respect to a mean value, a standard deviation and/or a statistical variance.

For cleaning noise or noise components the value of the given pixel PBjkab is replaced by a lowest value of the four values of the statistical property Var of the respective four neighbourhood regions N1, . . . , N4, in particular according to the following formula (II):

$$PBjkab(\text{original}) \mapsto PBjkab(\text{cleaned}) := \min\{\text{Var}(N1), \text{Var}(N2), \text{Var}(N3), \text{Var}(N4)\}, \quad (II)$$

with N1, . . . , N4 denoting the neighbourhood regions, Var(.) denoting the function for obtaining the statistical property of the respective neighbourhood region Nj with j=1, . . . , 4—in particular its variance over all picture elements or pixel PBjkab within said neighbourhood region Nj—and min(.) denoting the minimum function.

Thereby noise or noise components may be removed and said contours, edges, wedges, structures, and/or textures essentially remain unchanged.

Then said contours, edges, wedges, structures and/or textures are extracted and refined in order to obtain an intermediate processed image IPI and respective intermediate digital image data IDI in which uniform sections USjk may therefore be cleaned from noise and noise components and in which said respective contours, edges, wedges, structures, and/or textures are enhanced.

An edge image may be derived as said intermediate processed image IPI.

Said edge image IPI is derived by detecting said contours, edges, wedges, structures, and/or textures using the absolute value of first derivatives in said underlying image I, said digital image data ID or said respective derivative thereof.

The respective first derivates may be obtained in a diagonal manner from top/left to bottom/right and from top/right to bottom/left.

Then an erosion algorithm may be applied in order to extent said contours, edges, wedges, structures, and/or textures, in particular in order to close holes and/or gaps and to finally obtain the intermediate processed image IPI.

Said processed image PI and said respective processed digital image data PID may be obtained by blending said intermediate processed image IPI with that original underlying image I or the respective digital image data PID, ID or respective derivatives thereof with the original image I being subjected to a two-dimensional sharpness enhancement process.

The process of blending may be performed on the basis of pixels PBjkab using a so-called blend value b, in particular ranging between 0 and 1 and further in particular according to the following formula (III):

$$PBjkab(PI) := b \cdot PBjkab(IPI) + (1-b) \cdot PBjkab(I) \quad \text{(III)}$$

with I denoting the image, IPI denoting the intermediate processed image, PI denoting the processed image, PBjkab(.) denoting the respective picture element or pixel, and b denoting the blending or mixing value.

A plurality of L blocks Bjk may be defined in said image, frame, or picture I, with L being an integer.

Said plurality of blocks Bjk or a sub-set thereof may cover the respective image, frame, or picture I completely.

Each of said blocks Bjk may be given by a number M×N of image elements or pixels PBjkab, with M, N being integers.

Each of said blocks Bjk have the same—in particular rectangular—shape and/or extension, in particular with respect to the number of M×N pixels PBjkab.

Blocks Bjk may be non-overlapping.

Blocks Bjk may overlap.

According to the present invention a system or an apparatus for sharpness enhancing digital image data is provided which is adapted and which comprises means for realising and performing a method for sharpness enhancing digital image data according to the present invention.

In addition, a computer program product is provided comprising computer program means which is adapted and arranged in order to perform and realise a method for sharpness enhancing digital image data according to the present invention and the steps thereof when it is executed on a computer or on a digital signal processing means.

According to a still further aspect of the present invention a computer readable storage medium is provided comprising a computer program product according to the present invention.

These and further aspects of the present invention will be further discussed in the following:

The present invention inter alia also relates to a method for controlling image sharpness enhancement on noisy images.

A new method for controlling the sharpness enhancement of noisy sequences is proposed. The method starts with local the analysis of the structure of the images. A pre-processing step cleans the uniform area from noise, leaving all contours in the image intact. In this image, edges and textures are extracted and refined. The resulting data is used to blend the unprocessed image with the sharpness enhanced image so that sharpness enhancement is only applied in textured areas and around edges but not in uniform areas.

Current state of the art for improving the image sharpness is based on a global sharpness control depending on the noise level of the image. If an image is very noisy, sharpness enhancement is typically switched off totally, as it enhances noise. If an image is not noisy, sharpness enhancement is applied. Intermediate steps are possible, but always the level of sharpness for the total image is changed.

One basic problem solved by the invention is the local change of the level of sharpness enhancement applied on an image depending on the content and the content's sensitivity to noise. For example in uniform area, noise is very visible, especially noise enhanced by sharpness enhancement algorithms. So no sharpness enhancement is applied in this area.

Figure 5:
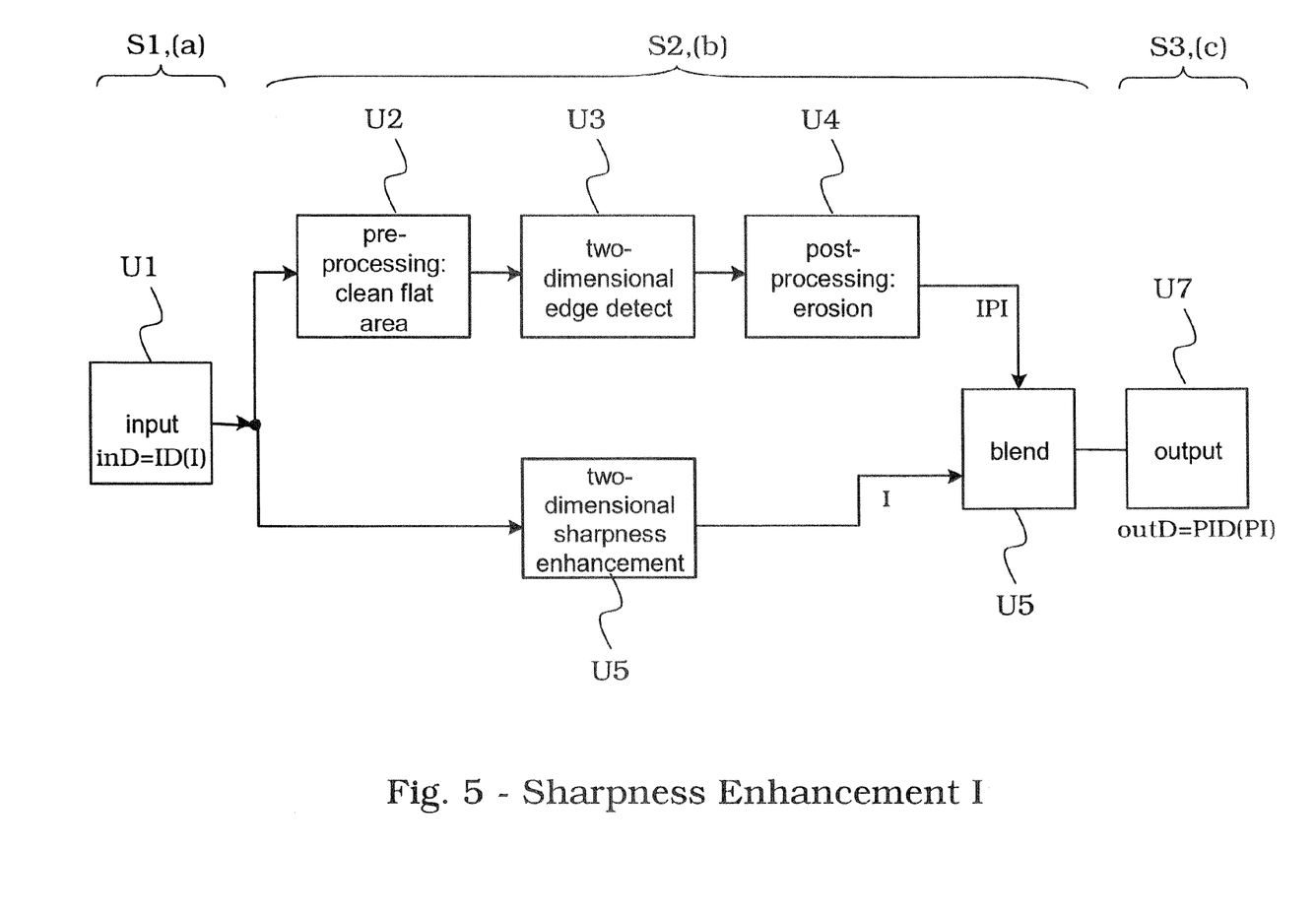
FIG. 5 is a schematic block diagram for elucidating the process of sharpness enhancement according to a first preferred embodiment of the present invention.
Figure 6:
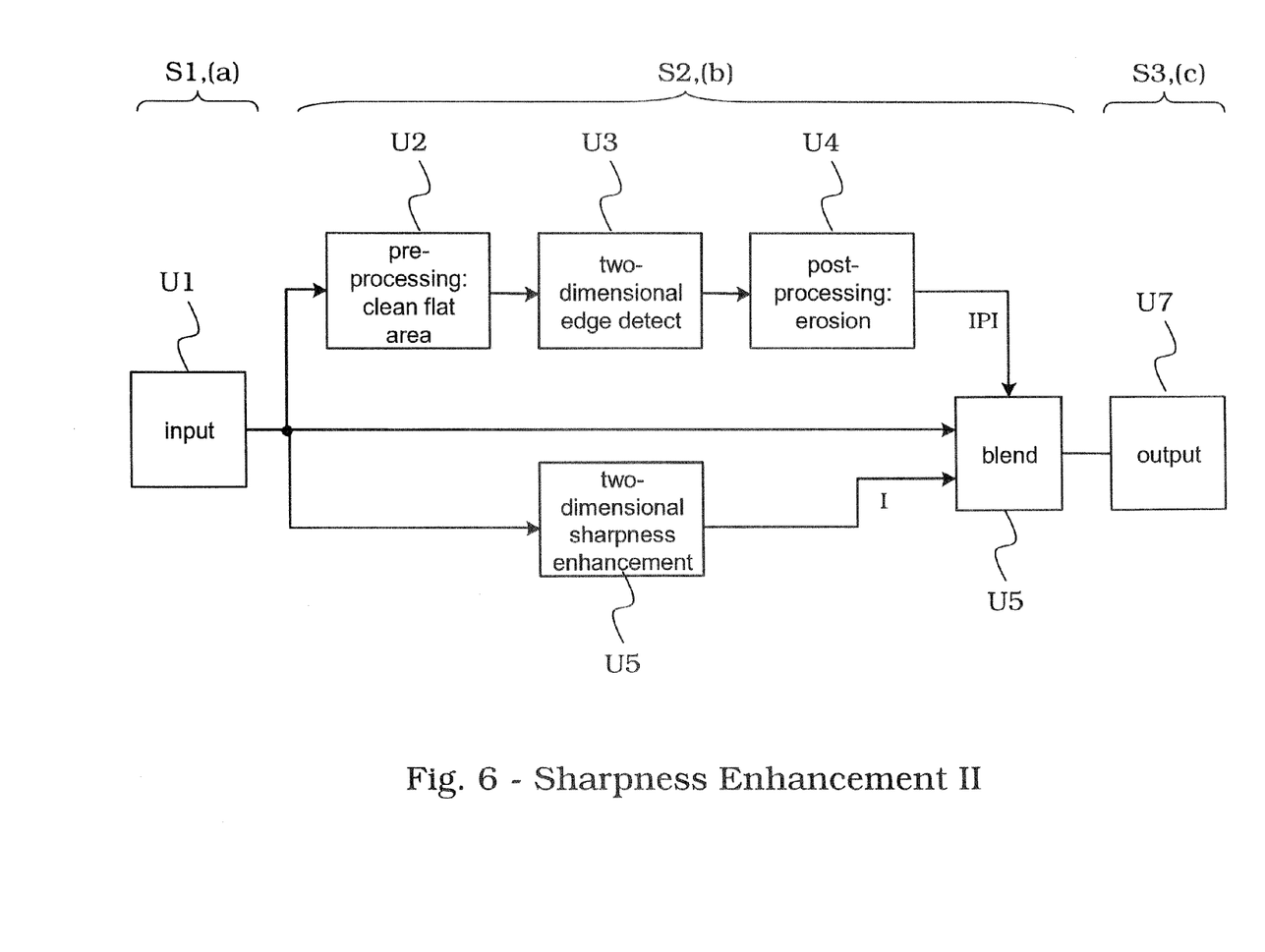
FIG. 6 is a schematic block diagram for elucidating the process of sharpness enhancement according to a second preferred embodiment of the present invention.

The method is described also in FIGS. 5 and 6.

First, a filter is applied on the image to remove noise in the flat area. The filter in use calculates mean and variance of local areas and flattens the image, leaving edges and textures intact.

From this image, an edge image is generated using the absolute value of the first derivatives. The first derivative is calculated diagonally top/left-bottom/right and top/right-bottom/left.

Then, an erosion algorithm is applied to extend the area with textures and details, i.e. to close holes and gaps.

The result, which has the same size as the original image, can be seen as a map of the flat area of the image. A small value of the map indicates a uniform area like a sky or a flat background. A big value indicates an area close to an edge (like a character on white paper) or within a textured area (like grass or leaves on a tree).

Then, two-dimensional sharpness enhancement is applied to the original image. This map is used to blend the sharpness enhanced image with the original image. In flat areas (map value is small), mostly the unprocessed signal is sent to the output. It textured areas (map value is big), mostly the processed signal is sent to the output.

With this improvement, a sharpness enhancement algorithm can be applied in full strength even on noisy sequences with minimized visual disturbance.

The optimum and robust solution according to the present invention works well on noisy and on noise-free sequences and adaptable to software and/or hardware solutions.

Figure 1:
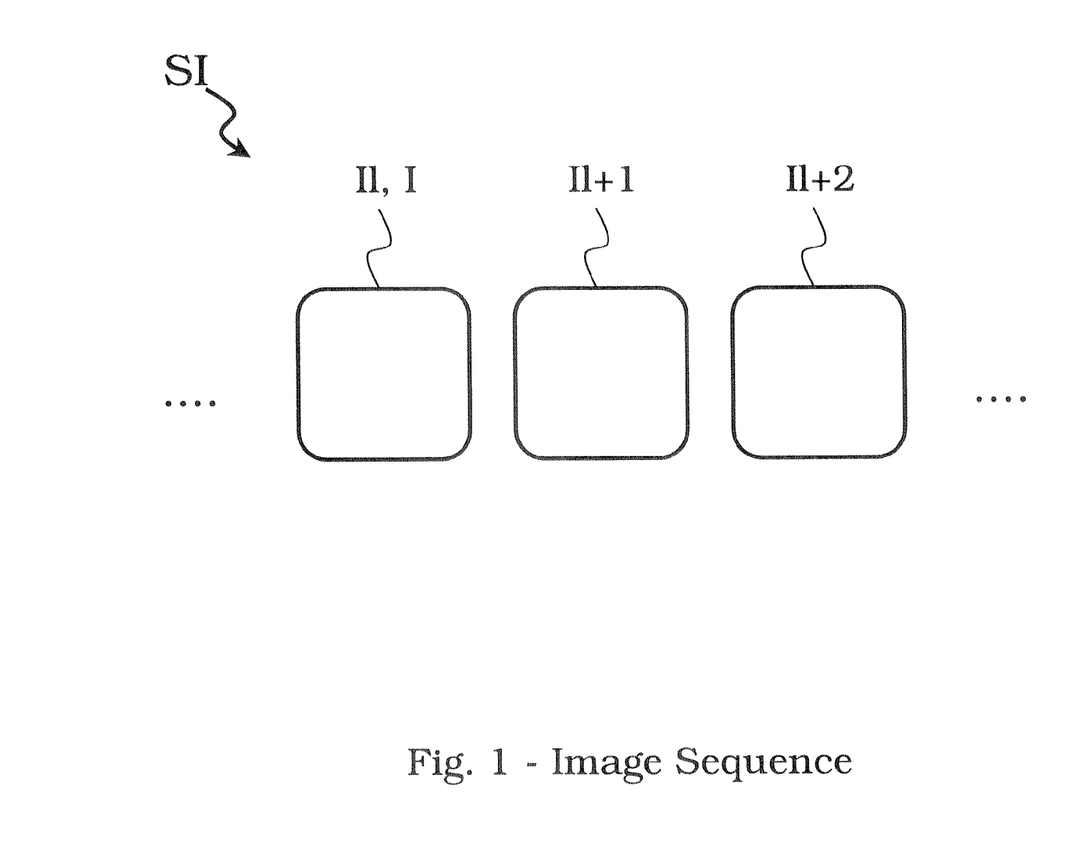
FIG. 1 is a schematic diagram for elucidating the structure of a sequence of images, which is used in the present invention.

In the following reference is again taken to the figures:

FIG. 1 is a schematic diagram for elucidating a structure of a sequence SI of images I or of a image sequence SI which can be processed according to the present invention.

In FIG. 1 the image sequence SI is composed of a sequence of images I1, I2, . . . , I1, I1+1, I1+2, . . . For each but the first image the image I1 is a directly preceding image, also denoted by I and I1+1 is referred to as a directly succeeding image. This is demonstrated by the linearly arranged sequence of squares I1, I1+1, I1+2 in FIG. 1.

Figure 2:
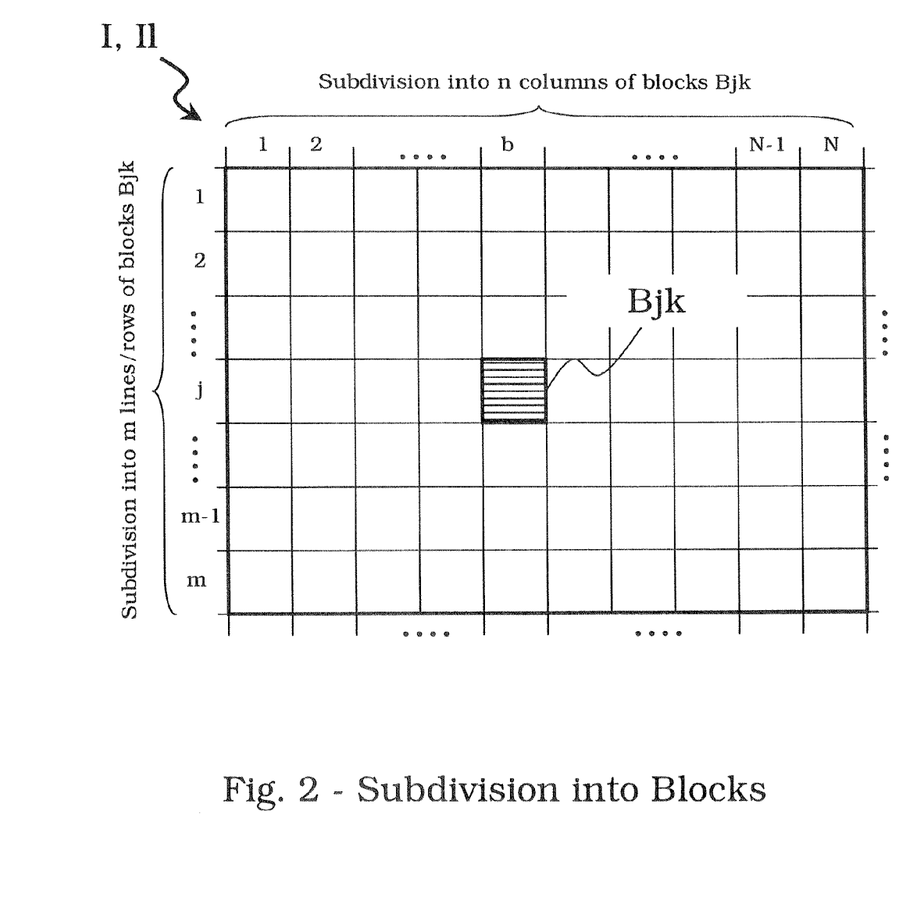
FIG. 2 is a schematic diagram for elucidating the structure of an image used in the context of the present invention.

In FIG. 2 a schematic demonstration of the structure of each of said images I1 is given. Each of the images I1—being a preceding image I or a succeeding image—is formed by a certain number of lines or rows and by a certain number of columns of picture elements which are also called pixels. According to the present invention the images I are subdivided into blocks Bjk. Therefore, each image I, I1 is subdivided into m lines and into n columns of blocks Bjk; j=1, . . . , m, k=1, . . . n.

Figure 3:
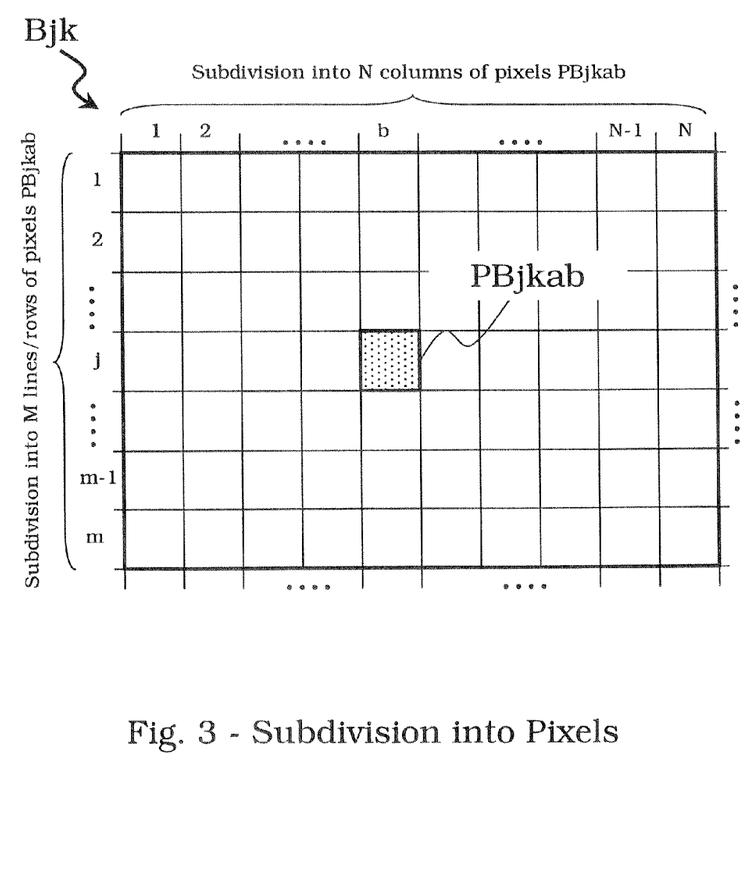
FIG. 3 is a schematic diagram, which elucidates the structure of a block within a given image used in the context of the present invention.

As the images I, I1 are formed by lines and rows of picture elements or pixels, the blocks Bjk, Bjk' are also formed by certain rows and columns of pixels PBjkab. One can assume—but it is not necessary—that each of the blocks has an identical extension, e.g. of M×N pixels. Then one has for each image I, I1 L=m×n blocks Bjk per image, picture or frame with each of said blocks Bjk having M×N pixels PBjkab; j=1, . . . , m; k=1, . . . , n; a=1, . . . , M; b=1, . . . , N.

Based on such a subdivision of the images I into blocks Bjk and into pixels PBjkab the inventive processing will be explained in the following based on the further FIGS. 4 to 7.

Figure 4:
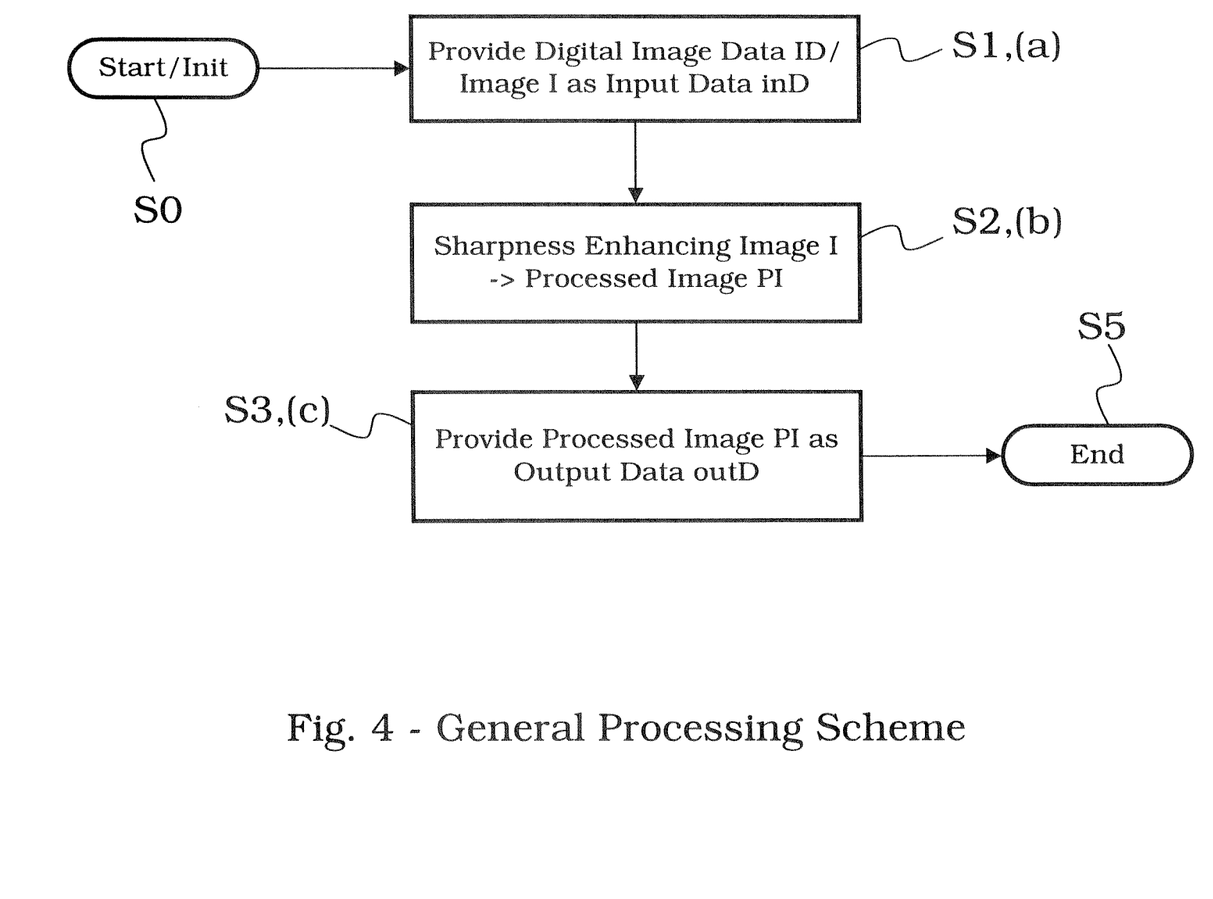
FIG. 4 is a schematic block diagram for elucidating some basic aspects of a preferred embodiment of the inventive method for estimating noise in an image sequence.

FIG. 4 elucidates in a schematic flow chart an embodiment of the inventive method for estimating noise in an image sequence, in particular in a video stream or the like.

After a starting or initialisation phase S0 digital image data ID for an image I to be sharpness enhanced are provided in a first step S1 as input data inD. The image I has a certain format, which might be in particular fixed for all images I of the sequence SI.

In a following step S2 the image I underlying the provided digital image data ID is sharpness enhanced by appropriately processing the image data ID. It is also possible to first of all derive some kind of data from the image data ID, e.g. the luminance, the chrominance or the like and to then perform the sharpness enhancement on such a derivative. By the enhancement process of step S2 processed image data PID derived which are representative for a processed, i.e. sharpness enhanced image PI or I'.

In a following fourth step S3 said processed image data PID and/or said processed image PI are provided and output as output data outD.

FIG. 5 is a schematic block diagram for elucidating a process of sharpness enhancement according to a first preferred embodiment of the present invention.

Again the whole process can be understood as a concatenation of a step S1 of providing digital image data ID, a step of sharpness enhancement S2, and a step S3 of providing the processed digital image data PID and the processed image I'.

In a first step U1 input data InD are received, provided or generated which represent as digital image data ID an underlying image I which might be one of a sequence SI of images I.

Said image data ID are fed into two independent processing streams. The first processing stream comprises a step U2 for pre-processing the image data ID in order to clean flat or uniform areas or sections USjk which are formed by or constituted by the respective image blocks Bjk from noise or noise components, a step U3 for two-dimensional edge detection and refinement, and a step U4 of post-processing the obtained cleaned and etch-refined image data in order to compensate erosion processes by filling holes or gaps.

In the parallel processing stream a single processing step U5 of two-dimensional sharpness enhancement on the original input data ID for the original image I is performed.

According to a following blending step U6 the two-dimensionally sharpness enhanced original image data ID and the intermediate image data IID which are cleaned from noise in the flat areas, etch-refined and erosion compensated are blended, i.e. they are mixed in order to provide processed image data PID corresponding to a processed image PI, I' in which only areas with contours, edges, wedges, structures or the like are enhanced, flat areas or uniform areas are cleaned from noise, wherein side effects of amplifying or enhancing the noise are reduced or avoided.

In a final step U7 the processed image PI, I' and the processed image data PID are provided and output as output data OutD.

FIG. 6 is a schematical block diagram for elucidating the structure of the enhancement process according to another preferred embodiment of the present invention. This embodiment is realised inter alia by three independent processing streams which are again considered by a blending or mixing process.

In a first step U1 input data InD are received, provided or generated which represent as digital image data ID an underlying image I which might be one of a sequence SI of images.

Said image data ID are fed into three independent processing streams. The first processing stream comprises a step U2 for pre-processing the image data ID in order to clean flat or uniform areas or sections USjk which are formed by or constituted by the respective image blocks Bjk from noise or noise components, a step U3 for two-dimensional edge detection and refinement, and a step U4 of post-processing the obtained cleaned and etch-refined image data in order to compensate erosion processes by filling holes or gaps.

In the parallel processing second stream a single processing step U5 of two-dimensional sharpness enhancement on the original input data ID for the original image I is performed.

In the parallel third processing stream non operation is performed on the original image data ID, they are just conveyed in an unchanged manner.

According to a following blending step U6 the original image, the two-dimensionally sharpness enhanced original image data ID and the processed intermediate image data PID which are cleaned from noise in the flat areas, etch-refined and erosion compensated are blended, i.e. they are mixed in order to provide processed image data PI corresponding to a processed image I' in which only areas with contours, edges, wedges, structures or the like are enhanced, flat areas or uniform areas are cleaned from noise, wherein side effects of amplifying or enhancing the noise are reduced or avoided.

In a final step U7 the processed image I' and the processed image data PID are provided and output as output data OutD.

The processing of the embodiment shown in FIG. 6 is in so far very similar to the processing of the embodiment shown in FIG. 5. However, in the embodiment of FIG. 6 in step U6 three signal components or data components are blended and mixed. First of all—comparable to the embodiment of FIG. 5—the noise cleaned, etch-refined, and erosion compensated intermediate processed image data IPD as well as the two-dimensional sharpness enhanced original image data ID are taken. However, in addition also the original image data ID are included into the blending or mixing process in order to obtain a processed image I' via respective processed image data PID.

FIG. 6 schematically elucidates the process of noise cleaning.

Figure 7:
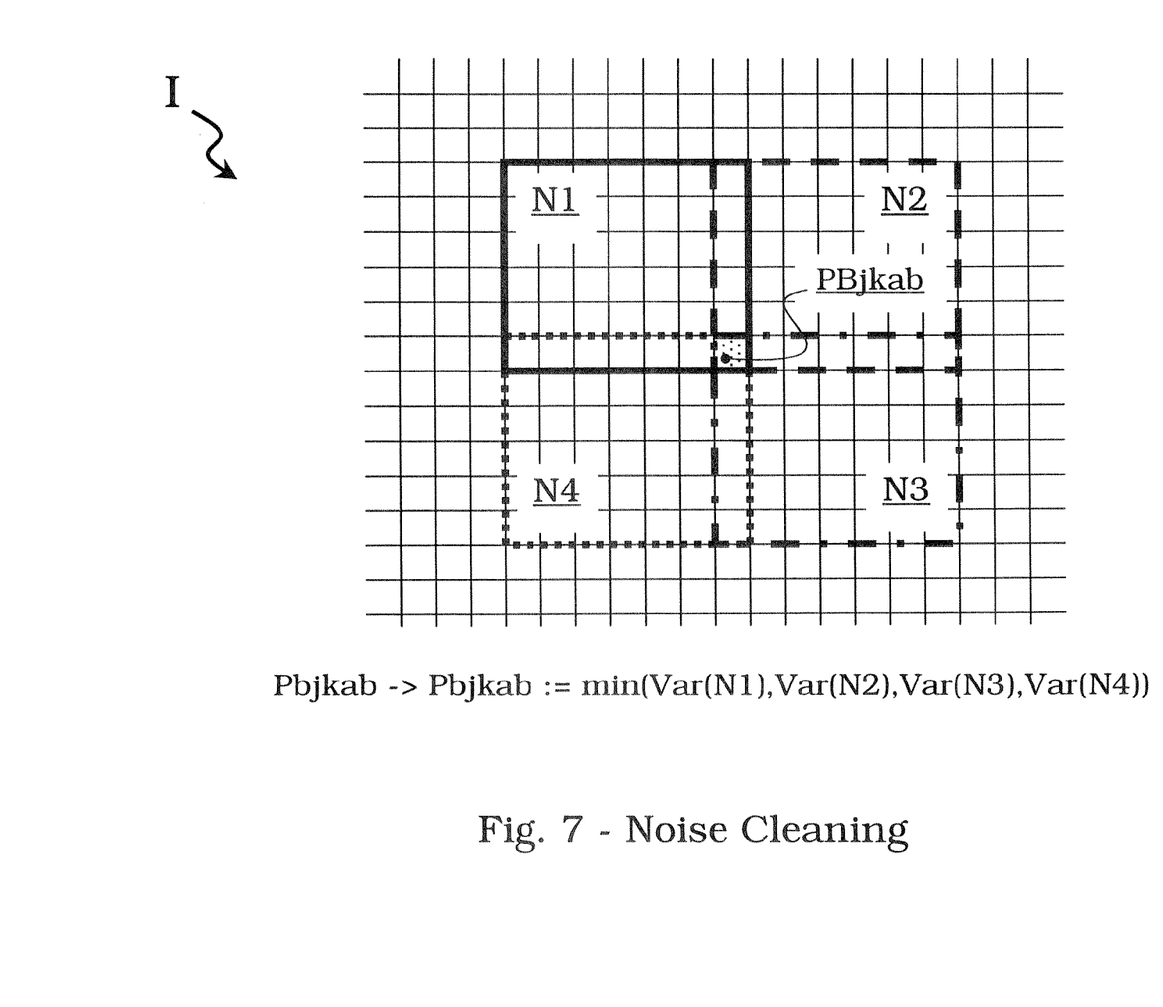
FIG. 7 is a schematic diagram for elucidating the process of noise cancellation according to a further preferred embodiment of the present invention.

In FIG. 7 an image I is given as a matrix of pixels PBjkab. The complete image I is again subdivided into blocks Bjk. FIG. 7 in detail demonstrates a certain block Bjk. Each of the pixels PBjkab is processed in order to clean the pixels from noise content or noise components. To do this, each pixel PBjkab is taken and respective sections N1, N2, N3, and N4 are defined. The relationship between the pixel PBjkab to be processed and the sections N1 to N4 is, that the respective pixel PBjkab in each case forms an edge element or edge pixel of the rectangular sections N1, N2, N3, N4. Then the variance values Var (NI) for l=1, . . . , 4 are calculated for the cleaned image data a respective cleaned pixel PBjkab' is defined as the minimum value of the variance values Var (NI) for l=1, . . . , 4.

REFERENCE SYMBOLS

B block, preceding block
Bjk block, preceding block, block of a preceding image/ frame, picture
I image/frame /picture
I' processed image/frame/picture
I1 image/frame/picture in the sequence SI
ID digital image data
inD input data
IPI intermediate processed image/frame/picture
L number of selected blocks per image/frame/picture
L' number of blocks in an image/frame/picture
m number of blocks in a column in an image/frame/picture
min(.) minimum function
M number of pixels in a column in a block
n number of blocks in a line/row in an image/frame/picture
N number of pixels in a line/row in a block
N1, N2, N3, N4 neighbourhood regions or sections
outD output data
PI processed image/frame/picture
PID processed image data
Pjkab image element, pixel in block Bjk of image/frame/ picture I
Pjkab' cleaned image element, cleaned pixel in block Bjk of image/frame/picture I
SI sequence of images/frames/pictures σ(.), sigma(.) uniformity function
U(.) uniformity function
Ujk uniformity function value for block Bjk
USjk uniform section
V, V(I) variance vector, vector of variance values for image I
Var(.) variance function

The invention claimed is:

1. A method for sharpness enhancing digital image data, said method comprising:
    generating a map of uniform sections of the digital image data, in which said uniform sections of the digital image data are cleaned from noise and in which at least one of a group consisting of contours, edges, wedges, structures and textures are detected,
    wherein said uniform sections each fulfil a predefined uniformity criterion, which is descriptive for at least one of a group consisting of uniformity, flatness, structure, and noise content;
    two-dimensional sharpness enhancing said digital image data to generate a sharpness enhanced image; and
    generating output data based on the map of uniform sections of the digital image data by pixelwise blending the digital image data with the sharpness enhanced image, wherein
    for uniform sections mostly the digital image data is used for generating the output data and for textured areas mostly the sharpness enhanced image is used for generating the output data,
    said generating the map includes cleaning the uniform sections based on a filter process,
    for each picture element or pixel (PBjkab) of a uniform section to be processed, four rectangular neighbourhood regions (N1, . . . , N4) having said pixel (PBjkab) as a corner are identified and evaluated with respect to at least one of a group consisting of a mean value, standard deviation, and statistical variance, and
    for cleaning noise a value of the pixel (PBjkab) is replaced by a lowest value of four values of a statistical property (Var) of the respective four rectangular neighbourhood regions according to the following formula:

$PBjkab(\text{original}) \mapsto PBjkab(\text{cleaned}) := \min\{\text{Var}(N1), \text{Var}(N2), \text{Var}(N3), \text{Var}(N4)\}.$ 2. The method according to claim 1,
    wherein said two-dimensional sharpness enhancing is performed blockwise for a plurality of blocks within said digital image data based on at least one of a group consisting of noise level, flatness level, and texture level of a respective block.

3. The method according to claim 2,
    wherein each of said blocks is given a number of M×N of pixels.

4. The method according to claim 3,
    wherein all said blocks have a same shape with respect to number of the M×N pixels.

5. The method according to claim 2,
    wherein the plurality of blocks are non-overlapping.

6. The method according to claim 2,
    wherein the plurality of blocks includes overlapping blocks.

7. The method according to claim 4,
    wherein said uniformity criterion is described by a function.

8. The method according to claim 4,
    wherein at least one of a group consisting of statistical properties, statistical standard deviation and statistical variance is used for said uniformity criterion.

9. The method according to claim 7, wherein a block is classified as a uniform section if a corresponding value of a uniformity function of the block is below a given threshold value.

10. The method according to claim 9, wherein a certain uniformity value is used as said threshold value which is obtained by applying said uniformity function to the digital image data.

11. The method according to claim 1, further comprising detecting at least one of the group consisting of contours, edges, wedges, structures and textures is performed by using an absolute value of first derivatives in said digital image data.

12. The method according to claim 11,
    wherein said first derivates are obtained in a diagonal manner from top/left to bottom/right and from top/right to bottom/left of the digital image data.

13. The method according to claim 1,
    wherein the generating the map includes applying an erosion algorithm in order to close gaps.

14. A non-transitory computer readable storage medium encoded with instructions, which when executed by a computer causes the computer to execute a method for sharpness enhancing digital image data, said method comprising:
    generating a map of uniform sections of the digital image data, in which said uniform sections of the digital image data are cleaned from noise and in which at least one of a group consisting of contours, edges, wedges, structures and textures are detected,
    wherein said uniform sections each fulfil a predefined uniformity criterion, which is descriptive for at least one of a group consisting of uniformity, flatness, structure, and noise content;
    two-dimensional sharpness enhancing said digital image data to generate a sharpness enhanced image; and
    generating output data based on the map by pixelwise blending the digital image data with the sharpness enhanced image, wherein
    for uniform sections mostly the digital image data is used for generating the output data and for textured areas mostly the sharpness enhanced image is used for generating the output data,
    said generating the map includes cleaning the uniform sections based on a filter process,
    for each picture element or pixel (PBjkab) of a uniform section to be processed, four rectangular neighbourhood regions (N1, . . . , N4) having said pixel (PBjkab) as a corner are identified and evaluated with respect to at least one of a group consisting of a mean value, standard deviation, and statistical variance, and
    for cleaning noise a value of the pixel (PBjkab) is replaced by a lowest value of four values of a statistical property (Var) of the respective four rectangular neighbourhood regions according to the following formula:

$PBjkab(\text{original}) \mapsto PBjkab(\text{cleaned}) := \min\{\text{Var}(N1), \text{Var}(N2), \text{Var}(N3), \text{Var}(N4)\}.$ 15. A system for sharpness enhancing digital image data, said system comprising:
    means for generating a map of uniform sections of the image, in which said uniform sections of the digital image data are cleaned from noise and in which at least one of a group consisting of contours, edges, wedges, structures and textures are detected, wherein said uniform sections each fulfil a predefined uniformity criterion, which is descriptive for at least one of a group consisting of uniformity, flatness, structure, and noise content;

means for two-dimensional sharpness enhancing said digital image data to generate a sharpness enhanced image; and means for generating output data based on the map by pixelwise blending the digital image data with the sharpness enhanced image, wherein for uniform sections mostly the digital image data is used for generating the output data and for textured areas mostly the sharpness enhanced image is used for generating the output data, said means for generating the map includes cleaning the uniform sections based on a filter process, for each picture element or pixel (PBjkab) of a uniform section to be processed, four rectangular neighbourhood regions (N1, ..., N4) having said pixel (PBjkab) as a corner are identified and evaluated with respect to at least one of a group consisting of a mean value, standard deviation, and statistical variance, and for cleaning noise a value of the pixel (PBjkab) is replaced by a lowest value of four values of a statistical property (Var) of the respective four rectangular neighbourhood regions according to the following formula:

$PBjkab(\text{original}) \mapsto PBjkab(\text{cleaned}) := \min\{\text{Var}(N1), \text{Var}(N2), \text{Var}(N3), \text{Var}(N4)\}.$

\* \* \* \* \*